United States Patent
Sharma et al.

(10) Patent No.: US 10,235,786 B2
(45) Date of Patent: Mar. 19, 2019

(54) CONTEXT AWARE CLIPPING MASK

(71) Applicant: Adobe Systems Incorporated, San Jose, CA (US)

(72) Inventors: Vikas Sharma, Lucknow (IN); Ajay Bedi, Hamirpur (IN)

(73) Assignee: Adobe Inc., San Jose, CA (US)

(*) Notice: Subject to any disclaimer, the term of this patent is extended or adjusted under 35 U.S.C. 154(b) by 105 days.

(21) Appl. No.: 15/294,355

(22) Filed: Oct. 14, 2016

(65) Prior Publication Data
US 2018/0108158 A1    Apr. 19, 2018

(51) Int. Cl.
*G06T 7/10* (2017.01)
*G06T 11/60* (2006.01)
*G06T 7/00* (2017.01)
*G06F 3/0484* (2013.01)

(52) U.S. Cl.
CPC .......... *G06T 11/60* (2013.01); *G06F 3/04845* (2013.01); *G06T 7/0081* (2013.01); *G06T 2200/24* (2013.01); *G06T 2207/10004* (2013.01); *G06T 2207/20164* (2013.01)

(58) Field of Classification Search
None
See application file for complete search history.

(56) References Cited

U.S. PATENT DOCUMENTS

| | | | |
|---|---|---|---|
| 7,346,212 B2* | 3/2008 | Cheatle | G06T 11/60 382/173 |
| 8,103,102 B2* | 1/2012 | Chien | G06K 9/4671 382/190 |
| 9,298,980 B1* | 3/2016 | Yuan | G06K 9/00456 |
| 2005/0047647 A1* | 3/2005 | Rutishauser | G06K 9/3233 382/159 |
| 2008/0260212 A1* | 10/2008 | Moskal | A61B 5/1079 382/118 |
| 2013/0013578 A1* | 1/2013 | Yang | G06F 17/30277 707/706 |
| 2014/0254922 A1* | 9/2014 | Wang | G06K 9/4671 382/159 |
| 2014/0348383 A1* | 11/2014 | Kamiya | G06K 9/00362 382/103 |

(Continued)

OTHER PUBLICATIONS

Gremillion, "How to use Illustrator's clipping mask and compound path tools", 2012, URL: https://99designs.com/blog/design-tutorials/adobe-illustrator-tutorial-clipping-mask-and-compound-path/.*

(Continued)

*Primary Examiner* — David H Chu
(74) *Attorney, Agent, or Firm* — Wolfe-SBMC (57) ABSTRACT

A context aware clipping mask is described. Context aware clipping masks may provide an automated approach for creating clipping sets that generate aesthetically pleasing photo texts. In at least some implementations, an input image is analyzed to generate an image saliency map and an image gradient map. A plurality of image rects of varying sizes and aspect ratios are generated on a grid over the input image. A score is assigned to each image rect, incorporating a visual composition, a boundary simplicity based on the image gradient map, and a content preservation based on the image saliency map. An image rect with the highest score is selected and utilized to create a photo text from the input image.

20 Claims, 8 Drawing Sheets

(56) References Cited

U.S. PATENT DOCUMENTS

| | | | |
|---|---|---|---|
| 2015/0170006 A1* | 6/2015 | Cohen | G06F 17/30247 |
| | | | 382/180 |
| 2015/0206169 A1* | 7/2015 | Ye | G06Q 30/0242 |
| | | | 705/14.41 |
| 2016/0093059 A1* | 3/2016 | Tumanov | G06T 7/11 |
| | | | 382/173 |
| 2016/0225053 A1* | 8/2016 | Romley | G06T 7/11 |
| 2017/0286779 A1* | 10/2017 | Fan | G06K 9/00778 |

OTHER PUBLICATIONS

Clement, "How to Use Clipping Masks in Photoshop", Apr. 3, 2013, URL: https://www.impressionsmagazine.com/screen-printing/graphics-design/how-to-use-clipping-masks-in-photoshop/.*

Margolin, "What Makes a Patch Distinct?", Computer Vision and Pattern Recognition (CVPR), 2013 IEEE Conference on, Jun. 2013, 8 pages.

* cited by examiner

CONTEXT AWARE CLIPPING MASK

BACKGROUND

Image processing applications allow for a user to create clipping masks in the shape of text that are usable to clip an image and create a photo text that incorporates portions of the image in the shape of the text. However, the process of creating clipping masks to create such photo texts is a complicated manual process. Further, placement of a clipping mask in a centered position on an image often results in a visually displeasing photo text, and the process of creating a clipping set that positions a clipping mask relative to an image is also a complicated manual process. A user that is familiar with both creating clipping masks and clipping sets may lack the artistic knowledge or experience to determine which portions of an image will be the most aesthetically pleasing. Additionally, a user cannot visually evaluate the aesthetic qualities of a particular photo text until it has already been created. Thus, determining an optimal size, shape, and location for a clipping mask presents a number of challenges.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A context aware clipping mask is described. Context aware clipping masks provide an automated approach for creating clipping sets that generate aesthetically pleasing photo texts. In at least some implementations, an input image is analyzed to generate an image saliency map that represents which portions of the input image are prominent, and an image gradient map that represents directional change of intensity or color in the input image. A plurality of image rects of varying sizes and aspect ratios are generated on a grid over the input image. Each image rect represents a portion of the grid imposed over the input image, and multiple image rects may overlap one another. A score is assigned to each image rect based on a visual composition, a boundary simplicity, and a content preservation. The visual composition of each image rect is determined by a machine learning system to determine a likelihood of importance of content within each image rect to human users. The boundary simplicity of each image rect is determined by using the image gradient map to determine where rect boundaries intersect with boundaries of edges within the input image. The visual composition of each image rect is determined by using the image saliency map to determine a concentration of salient portions within each image rect. An image rect with a highest score is selected and utilized to create a photo text that incorporates portions of the input image in the shape of a text.

BRIEF DESCRIPTION OF THE DRAWINGS

The detailed description is presented with reference to the accompanying figures. Entities represented in the figures may be indicative of one or more entities, and thus reference may be made interchangeably to single or plural forms of the entities in the discussion.

DETAILED DESCRIPTION

Overview

Techniques and systems for a context aware clipping mask are described. The context aware clipping mask provides a convenient approach for generating an aesthetically pleasing photo text with minimal involvement by a user. A user, for instance, selects an image and inputs a text. From this text, photo text is automatically generated using a context aware clipping mask from the selected image, such that portions of the image are incorporated as part of the text. These techniques help users to not only create clipping masks in the shape of text, but also to create clipping sets with the clipping masks placed in aesthetically pleasing locations and sizes relative to the selected image. A photo text is generated from the clipping sets, and a user may manipulate the photo text as an image, such as to place the photo text in a document, resize the photo text relative to other objects in the document, and so forth.

In at least some embodiments, an image analysis system implemented using at least one computing device is employed to process an input image and create an image saliency map and an image gradient map. For example, a user may wish to create a photo text of the word "Snow" from an image of a snowy mountain peak. The image analysis system first processes the image of the snowy mountain peak to create an image saliency map and an image gradient map. The image saliency map is a representation of which portions of the input are prominent, striking, or stand out relative to neighboring portions. The image gradient map is a representation of directional change of intensity or color in the input image, and can indicate where edges are located within the input image. A rect generation system densely samples a grid over the input image and generates rects of varying sizes and aspect ratios. Each image rect represents a portion of the grid imposed over the input image, and multiple image rects may overlap one another. The grid over the input image has locations correlating to locations within the input image, and thus each image rect has a location corresponding to a location within the input image.

Each rect is analyzed by a rect scoring system to determine how well each rect maintains a visual composition, a boundary simplicity, and a content preservation of the input image. The visual composition of each image rect is determined by a machine learning system, which determines a likelihood of importance of content within each image rect to human users. The boundary simplicity of each image rect is determined by using the image gradient map to determine where rect boundaries intersect with boundaries of edges within the input image. The visual composition of each image rect is determined by using the image saliency map to determine a concentration of salient portions within each image rect. In the current example, a determination of boundary simplicity includes determining how many times a boundary of a rect intersects an edge in the image, such as the edge between the mountain and the sky. Further, in the current example, determination of the visual composition by the image analysis system includes determining a likelihood of importance of the content to human users, while determining the content preservation may include determining the saliency of the portions of the image corresponding to the rect. The rect scoring system then selects a rect from the plurality of rects based on the score, e.g., with the highest score. In the current example, the selected rect is a rect that is generally centered on the peak of the mountain, regardless of the location of the peak of the mountain in the input image.

A photo text generation system of the computing device then utilizes the selected rect and a user input text to generate a photo text. The photo text generation system, for example, utilizes the input image as a top layer of a clipping set and utilizes the input text located at the selected rect as a bottom layer of the clipping set. In the current example, bottom layer of the clipping set, i.e. the clipping mask, is in the shape of the word "Snow", and is located over the peak of the mountain in the input image.

In this way, the rect scoring system determines suitability of portions of an image for creating a photo text without requiring user involvement, while the photo text generation system generates the clipping mask and applies the clipping mask to a clipping set with the image to create a photo text. Thus, the context aware clipping mask avoids the limitations of conventional techniques in which a user must manually create, size, and position a clipping mask in a clipping set with an image.

The context aware clipping mask may be configured in a variety of ways, such as a third-party module configured for inclusion in one or more applications being developed, as part of a stand-alone application, implemented as a web service, and so forth.

Further discussion of these and other examples is included in the following sections. In the following discussion, an example environment is first described that may employ the techniques described herein. Example procedures are then described which may be performed in the example environment as well as other environments.

Consequently, performance of the example procedures is not limited to the example environment and the example environment is not limited to performance of the example procedures.

Terminology Examples

Example descriptions or explanations of certain terms as used herein are set forth below. Each term is applicable to one or more, but not necessarily all, embodiments that are presented herein. Some terms are further elucidated using one or more examples.

A "photo text" refers to text that includes portions of an image within the borders of individual characters of the text. A photo text may incorporate portions of one or multiple images within the borders of individual characters of the text. A photo text may be represented as one or more images that represent one or more characters.

A "clipping mask" refers to an object whose shape masks other artwork so that only areas that lie within the shape are visible. In effect, a clipping mask will clip the artwork to the shape of the mask.

A "clipping set" refers to a clipping mask and objects that are masked by the clipping mask, and may comprise a group of layers. The bottommost layer, or base layer, defines the visible boundaries of the entire group of layers. In specific embodiments, a clipping mask is a bottom layer of a clipping set, and an image is a top layer of a clipping set.

A "saliency" refers to a quality by which an object, for example a pixel, stands out relative to its neighbors. A saliency is a distinct subjective perceptual quality that may make an object prominent, conspicuous, or striking, and grab the attention of a viewer.

A "rect" refers to a portion of a grid imposed over an image. A rect may be of any shape or size on a grid imposed over an image. In specific embodiments, a rect may refer to a rectangular shape on a grid imposed over an image.

"Machine Learning" refers to technology in a digital environment that is capable of producing an output based on an input using knowledge or intelligence garnered from training. In a supervised learning implementation, training samples are input to a machine learning system during training so that the machine can learn about at least one relationship incorporated into the training samples, such as visual composition of images. After the training, a machine learning apparatus can produce an output based on an input using the learned relationship. Examples of implementation techniques for machine learning for unsupervised or supervised learning may include association rule learning, support vector machines (SVMs), Bayesian networks, regression, artificial neural networks, convolutional neural networks, deep learning, and combinations thereof. As used herein, a "machine learning system" can produce a model that incorporates a learned relationship.

A "visual composition model" refers to a model produced with machine learning so as to characterize images such that images can be compared to one another in terms of at least visual composition. The comparison of visual composition of images may include determining a likelihood of importance of content to human users. A visual composition model can be implemented as, for example, a processor-executable module, a convolutional artificial neural network, or a combination thereof.

Example Environment

Figure 1:
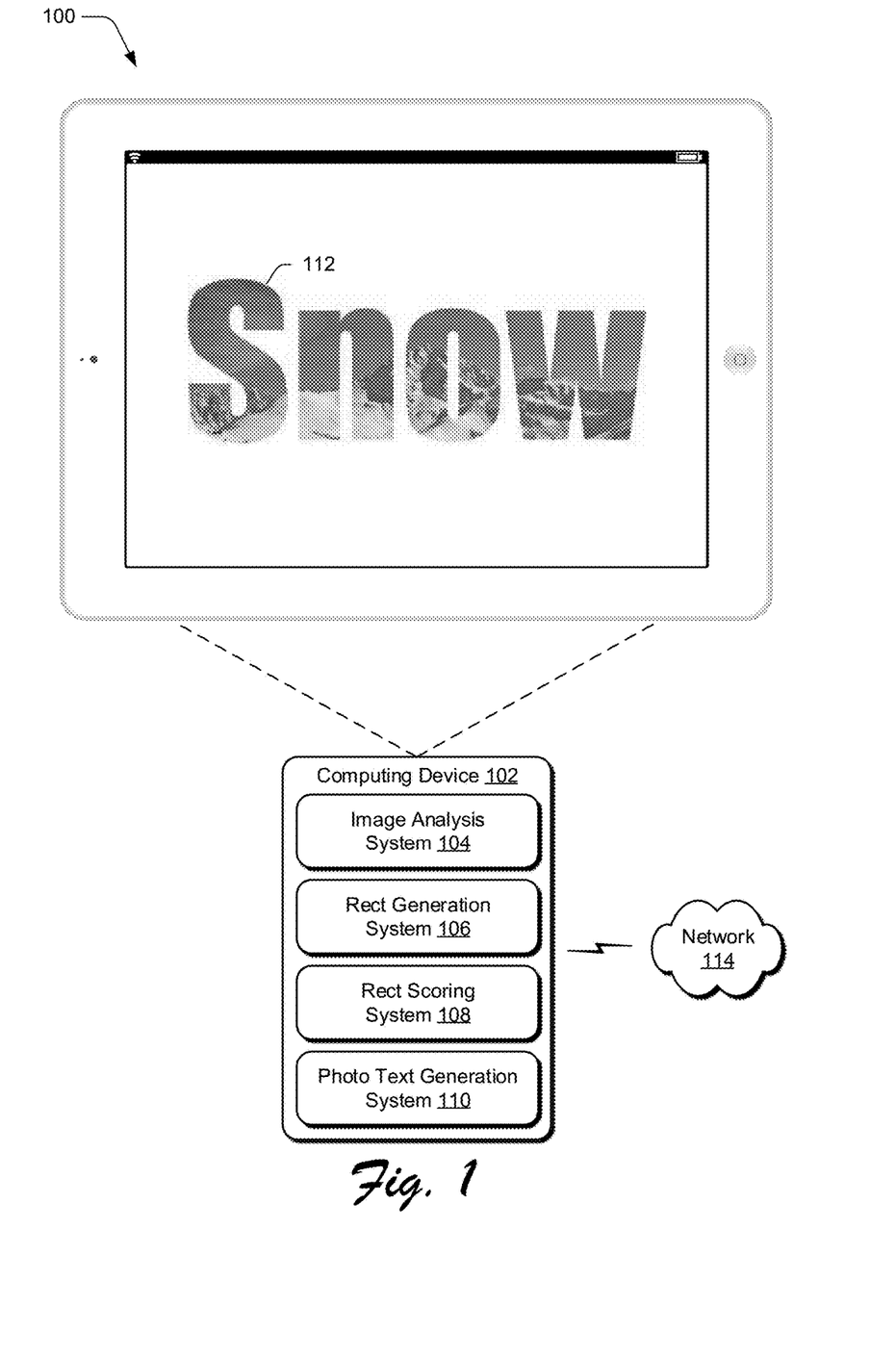
FIG. 1 is an illustration of an environment in an example embodiment that is operable to employ techniques described herein.

FIG. 1 is an illustration of an environment 100 in an example embodiment that is operable to employ techniques described herein. The illustrated environment 100 includes a computing device 102 having a processing system that may include one or more processing devices (e.g., processors) and one or more computer-readable storage media as further described in relation to FIG. 8. The computing device 102 includes an image analysis system 104, a rect generation system 106, a rect scoring system 108, and a photo text generation system 110 embodied on the computer-readable storage media and operable via the processing system to implement corresponding functionality described herein to create a photo text 112. In at least some embodiments, the computing device 102 may include functionality to access web-based resources (e.g., content and services), browse the Internet, interact with online providers, and so forth as described in further detail below, such as through a network 114.

The computing device 102 may be configured as any suitable type of computing device. For example, the computing device 102 may be configured as a desktop computer, a laptop computer, a mobile device (e.g., assuming a handheld configuration such as a tablet or mobile phone as illustrated), a tablet, a device configured to receive gesture input, a device configured to receive three-dimensional (3D) gestures as input, a device configured to receive speech input, a device configured to receive stylus-based input, a device configured to receive a combination of those inputs, and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as further described in relation to FIG. 8.

The computing device 102 may further communicate with one or more service provider systems over the network 114, such as the Internet, to provide a "cloud-based" computing environment. Generally speaking, a service provider system is configured to make various resources available over the network 114 to client devices. In some scenarios, users may sign up for accounts that are employed to access corresponding resources from a service provider system. The service provider system may then authenticate credentials of a user (e.g., username and password) before granting access to an account and corresponding resources. Other resources may be made freely available, (e.g., without authentication or account-based access). The resources can include any suitable combination of services and/or content typically made available over a network by one or more providers. Some examples of services include, but are not limited to, photo editing services, image illustrating services, photo printing services (e.g., Snapfish®, Shutterfly®, and the like), photo store and/or sharing services (e.g., Flickr®), social network services (e.g., Facebook®, Twitter®, Instagram®, and the like), and so forth.

The computing device 102 is illustrated as including the image analysis system 104. The image analysis system 104 is representative of logic implemented at least partially in hardware to generate an image saliency map and an image gradient map for an input image, e.g., through use of a processing system, computer executable instructions stored on computer-readable storage media, integrated circuits, and so on as further described in relation to FIG. 8. The image analysis system 104, for instance, may determine what portions of an image are distinct and what portions of an image contain edges as further described in relation to FIG. 2.

The computing device 102 is further illustrated as including the rect generation system 106. The rect generation system 106 is representative of logic implemented at least partially in hardware of the computing device 102 to generate a plurality of image rects over the input image, e.g., through use of a processing system, computer executable instructions stored on computer-readable storage media, integrated circuits, and so on as further described in relation to FIG. 8. The rect generation system 106, for instance, may generate a variety of rects of different sizes and aspect ratios that are located in various locations over the input image as further described in relation to FIG. 2.

The computing device 102 is further illustrated as including the rect scoring system 108. The rect scoring system 108 is representative of logic implemented at least partially in hardware of the computing device 102 to assign a score to each of the plurality of image rects over the input image, e.g., through use of a processing system, computer executable instructions stored on computer-readable storage media, integrated circuits, and so on as further described in relation to FIG. 8. The rect scoring system 108, for instance, may utilize the saliency map and the gradient map generated by the image analysis system 104 to assign a score to each individual image rect and select a rect with the highest score as further described in relation to FIG. 2.

The computing device 102 is further illustrated as including the photo text generation system 110. The photo text generation system 110 is representative of logic implemented at least partially in hardware of the computing device 102 to generate a photo text 112 from an input image, e.g., through use of a processing system, computer executable instructions stored on computer-readable storage media, integrated circuits, and so on as further described in relation to FIG. 8. The photo text generation system 110, for instance, may locate a clipping mask at the location of the rect with the highest score to generate a photo text 112 such that portions of the image are incorporated as part of an input text as further described in relation to FIG. 2.

The network 114 is a network via which the computing device 102 can communicate with other connected entities, such as one or more additional computing devices, servers, and so forth. Although the network 114 is illustrated as the Internet, the network may assume a wide variety of configurations. For example, the network 114 may include a wide area network, a local area network, a wireless network, a public telephone network, an intranet, and so on. Further, although a single network 114 is shown, the network 114 may be representative of multiple networks.

In at least some embodiments, the image analysis system 104, the rect generation system 106, the rect scoring system 108 and the photo text generation system 110 are configured to operate in connection with content editing applications that may use application-specific and/or proprietary formats. By way of example and not limitation, one of the applications may be configured as an image processing application, one example of which is Adobe® Photoshop® Elements. Other content and image editor applications are also contemplated.

Having considered an example environment, consider now a discussion of some example details of the techniques for the context aware clipping mask in accordance with one or more embodiments.

Context Aware Clipping Mask

Figure 2:
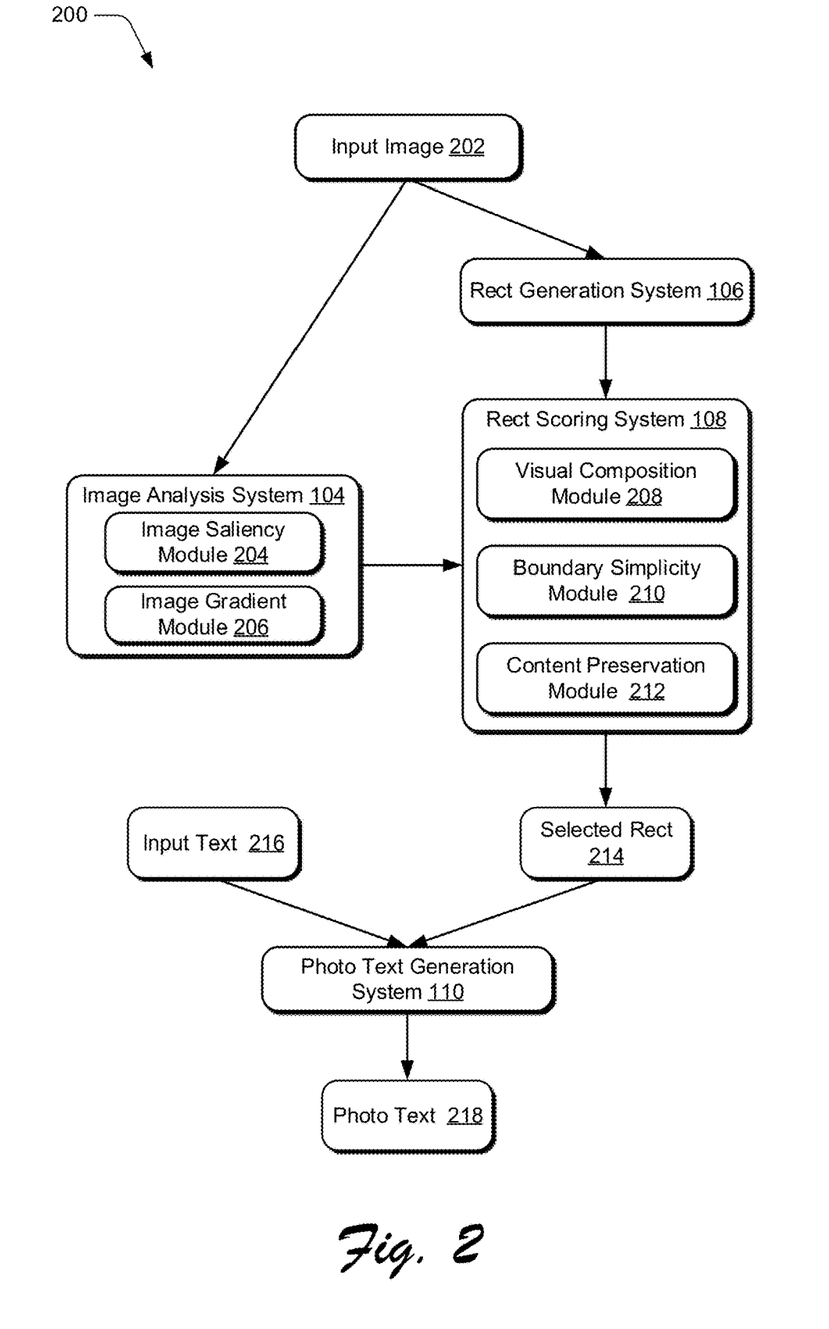
FIG. 2 depicts an example implementation scenario in which a photo text is generated.

This section describes some example details of a context aware clipping mask in accordance with one or more embodiments. FIG. 2 depicts an example implementation scenario 200 showing the image analysis system 104, the rect generation system 106, the rect scoring system 108, and the photo text generation system 110 of FIG. 1 implemented as a pipeline formed using a plurality of modules. To begin, the image analysis system 104 is illustrated as receiving an input image 202. For example, the image analysis system 104 can receive data representing captured images from a camera or other image capture device. Input received by the image analysis system 104 can include various other types of input, such as portions of captured images, data identifying objects in captured images, and so forth. Although generally described throughout as a singular image, the input image 202 may refer multiple images, a video, and so forth.

The input image 202 in scenario 200 is processed by an image saliency module 204 of the image analysis system 104. The image saliency module 204 is representative of logic implemented at least partially in hardware (e.g., as a processing system and computer-readable storage medium, integrated circuit, and so on as described in relation to FIG. 8) to analyze an input image to generate an image saliency map. This analyzing, for instance, may determine what portions of an image have a distinctness that causes the portions to stand out from neighboring portions and grab the attention of a viewer. To achieve this, the image saliency module 204 performs a pattern distinctness detection, a color distinctness detection, and incorporate priors on human preferences and image organization.

The pattern distinctness detection performed by the image saliency module 204 defines a pattern distinctness $P(p_x)$ as:

$$P(p_x)=\|\tilde{p}_x\|_1$$

where $\tilde{p}_x$ is $p_x$'s coordinates in the Principal Component Analysis (PCA) coordinate system. To disregard lighting effects, the image saliency module 204 may a-priori subtract from each patch its mean value. To detect distinct regions regardless of their size, the image saliency module 204 computes the pattern distinctness, using the above formula, in three resolutions at 100%, 50%, and 25%, and average the three results. Finally, the image saliency module 204 applies morphological operations to fill holes in the pattern map.

The color distinctness detection performed by the image saliency module 204 segments the image into regions and then determines which regions are distinct in color. For instance, by using SLIC superpixels to segment the image into M regions, the color distinctness C of a region $r_x$ may be defined as:

$$C(r_x) = \sum_{i=1}^{M} \|r_x - r_i\|_2.$$

The image saliency module 204 may further compute the color distinctness in three resolutions at 100%, 50%, and 25%, and average the three results.

To determine regions that are both salient in color and salient in pattern, the image saliency module 204 generates a distinctness map by taking the product of the pattern distinctness and the color distinctness as follows:

$$D(p_x)=P(p_x)\cdot C(p_x)$$

The distinctness map $D(p_x)$ may be normalized to the range [0,1]. Further, known priors on image organization are applied to the distinctness map. For example, salient pixels tend to be grouped into clusters, and photographers tend to place the subject of a photograph near the center of the image. A weight map $G(p_x)$ is created that is the weighted sum of the impact of all known priors on image organization. A final saliency map $S(p_x)$ is generated by taking the product of the distinctness map and the weight map as follows:

$$S(p_x)=G(p_x)\cdot D(p_x)$$

The input image 202 in scenario 200 is then processed by an image gradient module 206 of the image analysis system 104. The image gradient module 206 is representative of logic implemented at least partially in hardware (e.g., as a processing system and computer-readable storage medium, integrated circuit, and so on as described in relation to FIG. 8) to analyze an input image to generate an image gradient map. This analyzing, for instance, may determine a directional change in the intensity or color in an image. Any suitable method may be used by the image gradient module 206 to generate an image gradient, such as the Sobel Operator.

Further, the rect generation system 106 is illustrated in scenario 200 as receiving the input image 202. For example, the image analysis system 104 can receive data representing captured images from a camera or other image capture device. Input received by the image analysis system 104 can include various other types of input, such as portions of captured images, data identifying objects in captured images, and so forth. The rect generation system 106 densely samples on a grid over the input image 202. At each location on the grid, rects of different sizes and different aspect ratios are generated. The size of a rect may be determined as an area of the rect, and multiple rects of different aspect ratios may exist for a single size.

The rect scoring system 108 is illustrated as receiving the image saliency map and the image gradient map from the image analysis system 104, and the generated rects from the rect generation system 106.

The generated rects in scenario 200 are processed by a visual composition module 208 of the rect scoring system 108. The visual composition module 208 is representative of logic implemented at least partially in hardware (e.g., as a processing system and computer-readable storage medium, integrated circuit, and so on as described in relation to FIG. 8) to determine what portions of an image users would like to see. This determining utilizes a machine learning system to analyze the visual composition of the image. The visual composition module 208 is trained using a machine learning system tuned to recognize portions of an image that users would choose as being the most desirable portions of the image. The machine learning system refers to technology in a digital environment that is capable of producing an output based on an input using knowledge or intelligence garnered from training. Training samples are input to a machine learning system during training so that the machine can learn about at least one relationship incorporated into the training samples, in this case visual composition. In this example, the training samples are a dataset of photographs along with data representing what portions of the photographs users have chosen as the best areas of the photographs. After the training, a machine learning apparatus, in this example the visual composition module 208 of the rect scoring system 108, outputs a likelihood of importance of content to human users based on an input using the learned relationship. Accordingly, the visual composition module 208 determines what portions of the input image 202 may be the subjectively best areas of the input image 202, based on the learned relationship from the dataset of photographs. The visual composition module 208 utilizes this determination to quantitatively represent the desirability of the area of the image corresponding to each generated rect as a number or score.

The generated rects in the scenario 200 are then processed by a boundary simplicity module 210 of the rect scoring system 108. The boundary simplicity module 210 is representative of logic implemented at least partially in hardware (e.g., as a processing system and computer-readable storage medium, integrated circuit, and so on as described in relation to FIG. 8) to determine which of the generated rects correspond to visually simpler regions of the image. This determination includes determining edges and object boundaries in the image. Pixels with large gradient values are frequently edge pixels and are be utilized to detect edges in an image. Accordingly, the boundary simplicity module 210 receives the image gradient map from the image gradient module 206, and generates an edge map by using any suitable method such as the Sobel, Canny, Prewitt, Roberts, and fuzzy logic methods. The boundary simplicity module 210 quantitatively represents the visual simplicity of the area of the image corresponding to each generated rect as a number or score, and may for instance reduce the score for an area for each edge that intersects with the rect boundaries.

The rect scoring system 108 then utilizes a content preservation module 212 to process the generated rects. The content preservation module 212 is representative of logic implemented at least partially in hardware (e.g., as a processing system and computer-readable storage medium, integrated circuit, and so on as described in relation to FIG. 8) to analyze the image and determine which of the generated rects correspond to visually important content within the image. This analyzing, for instance, may utilize an image saliency map to determine which rects have the highest visual saliency. The content preservation module 212 receives the image saliency map from the image saliency module 204, and quantitatively represents how well each generated rect preserves the salient content of the image as a number or score.

The rect scoring system 108 measures the scores of each rect from the visual composition module 208, the boundary simplicity module 210, and the content preservation module 212, and aggregates the scores into a single score for each rect. This aggregation may be a simple addition of the scores, or may incorporate weighting a particular score higher or lower than another score. The rect scoring system 108 selects a rect 214 that has the highest aggregate score.

The photo text generation system 110 is illustrated as receiving the selected rect 214 from the rect scoring system 108, and receiving an input text 216. The input text 216 may originate in a variety of ways, such as detected using a touchscreen functionality of a display device, use of a cursor control device or stylus, detected using a camera and without using touch as part of a natural user interface, use of a keyboard, and so forth. In some embodiments, the input text 216 may be accompanied by a specified font and/or style of text. The photo text generation system 110 utilizes the selected rect 214 as a clipping mask rect inside which the input text 216 will be written. A clipping mask is created in the location of the selected rect 214 that incorporates the shape of the input text 216. The photo text generation system 110 utilizes the input image 202 as a top layer of a clipping set and utilizes the input text 216 as a bottom layer of the clipping set, with the input text 216 located in a location corresponding to the selected rect 214 and having a size corresponding to the size of the selected rect 214. Upon applying the clipping mask as a bottom layer of the clipping set, the photo text generation system 110 generates a photo text 218 that includes portions of the input image 202 shaped to appear as the input text 216. In embodiments wherein the input image 202 includes a video, the photo text 218 may include portions of the video shaped to appear as the input image 216, such that the photo text 218 includes a temporal aspect and appears as a motion text when played or displayed. The photo text generation system 110 may perform additional functions in generating the photo text 218, such as by including a bevel, a drop shadow, and/or a stroke along the edges of the photo text 218. The photo text 218 is output to a user device, rendered in a user interface of the computing device 102, and/or stored in a format capable of being later output or displayed. For instance, the photo text 218 may be output as an image file capable of being manipulated by a user.

Figure 3:
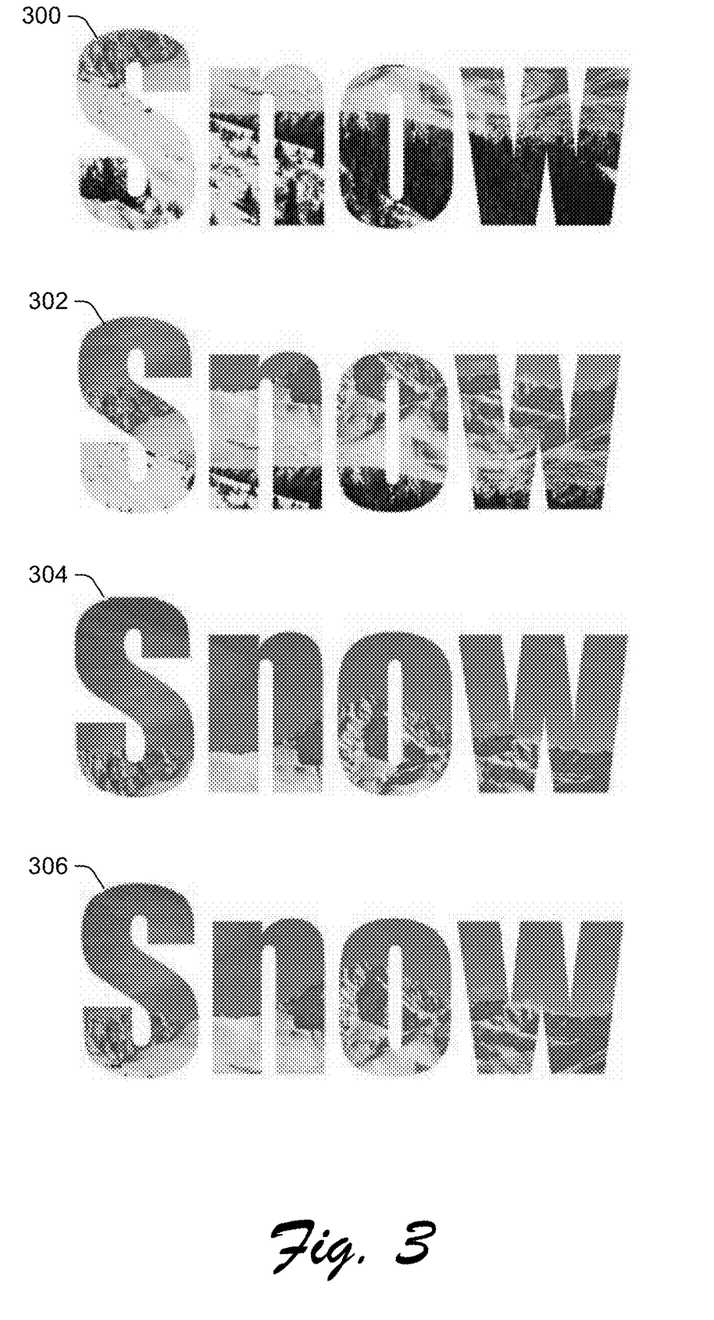
FIG. 3 depicts example photo texts.

FIG. 3 depicts example photo texts 300, 302, 304, and 306 created from clipping sets utilizing different rects of the same image. In each of these examples, a photo text of the word "Snow" is created from an image of a snow-covered mountain. The example photo text 300 was created utilizing a poor clipping set, with the clipping mask rect located well below the peak of the mountain. For instance, the clipping mask rect used to generate the example photo text 302 does not include the peak of the mountain, and nearly every edge of the clipping mask cuts through edges within the image. The example photo text 302 was similarly created utilizing a poor clipping set, with the clipping mask rect located slightly below the peak of the mountain. For instance, the clipping mask rect used to generate the example photo text 302 does not include the peak of the mountain, and many edges of the clipping mask cut through edges within the image. The example photo text 304 was created using a better clipping set than those used to generate the example photo texts 300 and 302, but with a worse clipping set than that used to generate the example photo text 306. Both the example photo text 304 and the example photo text 306 include the peak of the mountain, however the example photo text 304 cuts through more edges within the image than the example photo text 306. For instance, the bottom angle of white space in the letter W cuts through the ridge separating the mountain and the sky in the example photo text 304, but does not cut through the ridge in the example photo text 306. Further, the bottom edges of the letters S and O pass through complex rocky regions in the example photo text 304, but pass through simply snowy regions in the example photo text 306.

Figure 4:
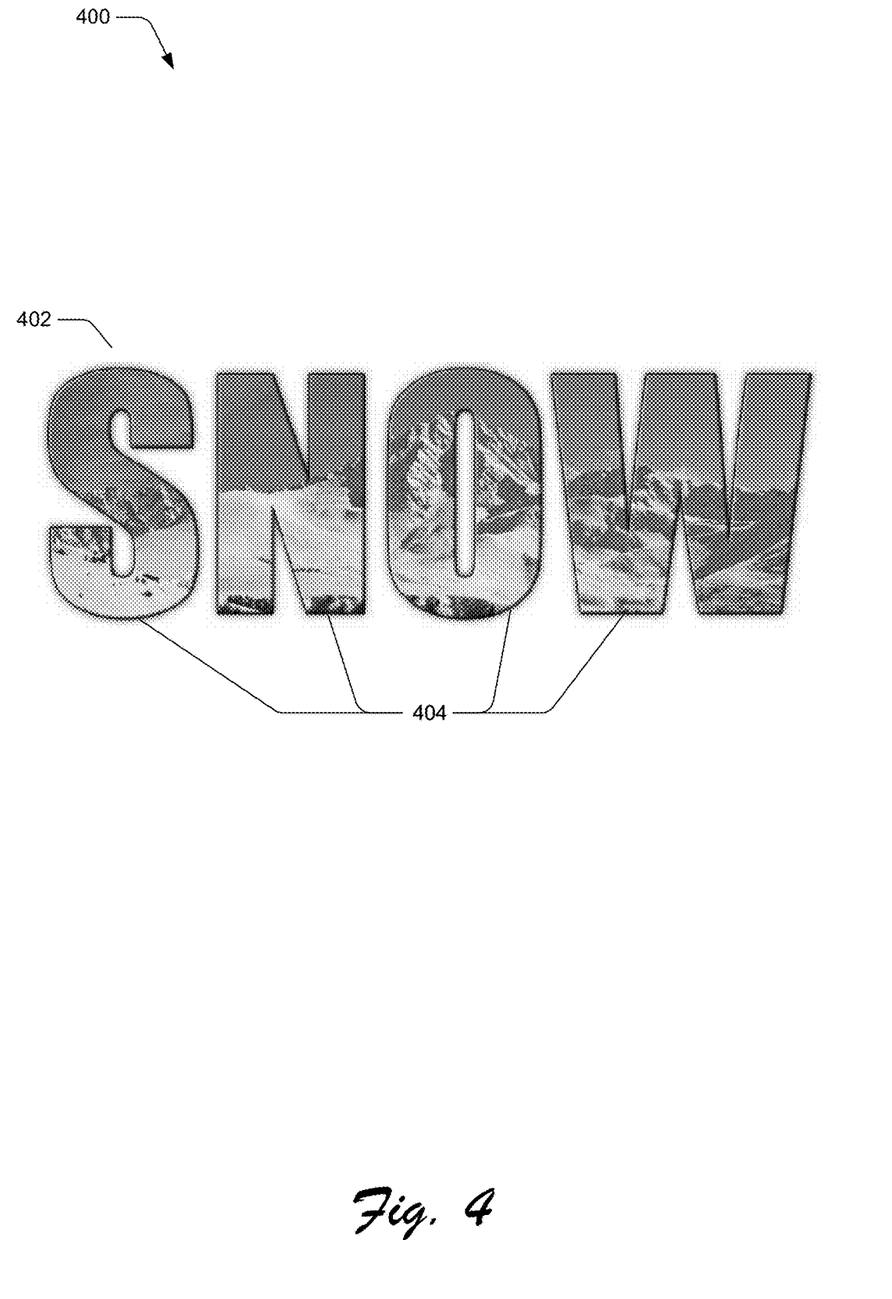
FIG. 4 depicts an example display scenario with an end-user device showing an example photo text.

FIG. 4 depicts an example display scenario in which an end-user device shows an example photo text. The display scenario 400, for example, may be the result of the scenario 200 of FIG. 2. The display scenario 400 is illustrated with a photo text 402. The photo text 402 is a photo text of the word SNOW created from an image of a snow-covered mountain. The photo text 402 may be, for instance, the photo text 218 of the scenario 200 of FIG. 2. Further, the photo text 402 includes a combination of a bevel, a drop shadow, and a stroke, collectively illustrated as bevel 404. The bevel 404 was added to the photo text 402, for instance, by the photo text generation system 110 of the scenario 200 of FIG. 2.

Example Procedures

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1 and 2.

Figure 5:
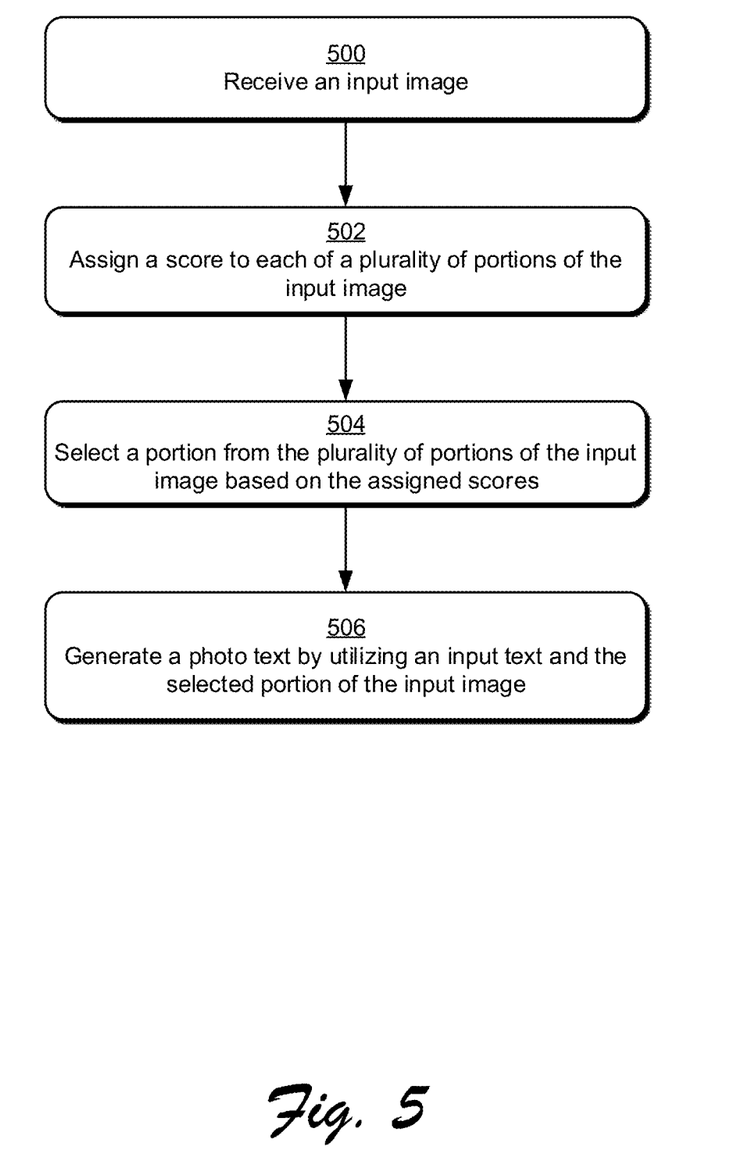
FIG. 5 is a flow diagram depicting a procedure in accordance with one or more embodiments.

FIG. 5 is a flow diagram depicting a procedure in an example embodiment in which a photo text is generated from an input image and an input text.

Step 500 receives an input image. For example, the image analysis system 104 and/or the rect generation system 106 receives data representing captured images from a camera or other image capture device. The input image may be received from a camera included as a part of the computing device 102, may be received through the network 114, and so forth.

Step 502 assigns a score to each of a plurality of portions of the input image. For example, the rect scoring system 108 assigns a score to each of a plurality of portions of the input image. The assigning is based on an image saliency map of the input image, an image gradient map of the input image, and/or by analyzing the input image with a machine learning system to determine a visual composition of the image. The assigning may generate separate scores for visual composition, boundary simplicity, and/or content preservation. These scores may be aggregated into a single overall score for each portion of the input image.

Step 504 selects a portion from the plurality of portions of the input image based on the assigned scores. The selected portion is, for instance, a portion with a highest overall assigned score.

Step 506 generates a photo text by utilizing an input text and the selected portion of the input image. For example, the photo text generation system 110 creates a clipping mask incorporating the shape of the input text and creates a clipping set with the clipping mask located at the selected portion of the input image. The clipping mask is applied to the input image to remove all image data that is outside of the shape of the input text in the clipping mask, leaving only image data inside of the shape of the input text. The generated photo text is configured in a format that may be output or displayed, such as via a user interface of an end-user computing device. In some embodiments, the generated photo text is output as a candidate for placement in a document.

Figure 6:
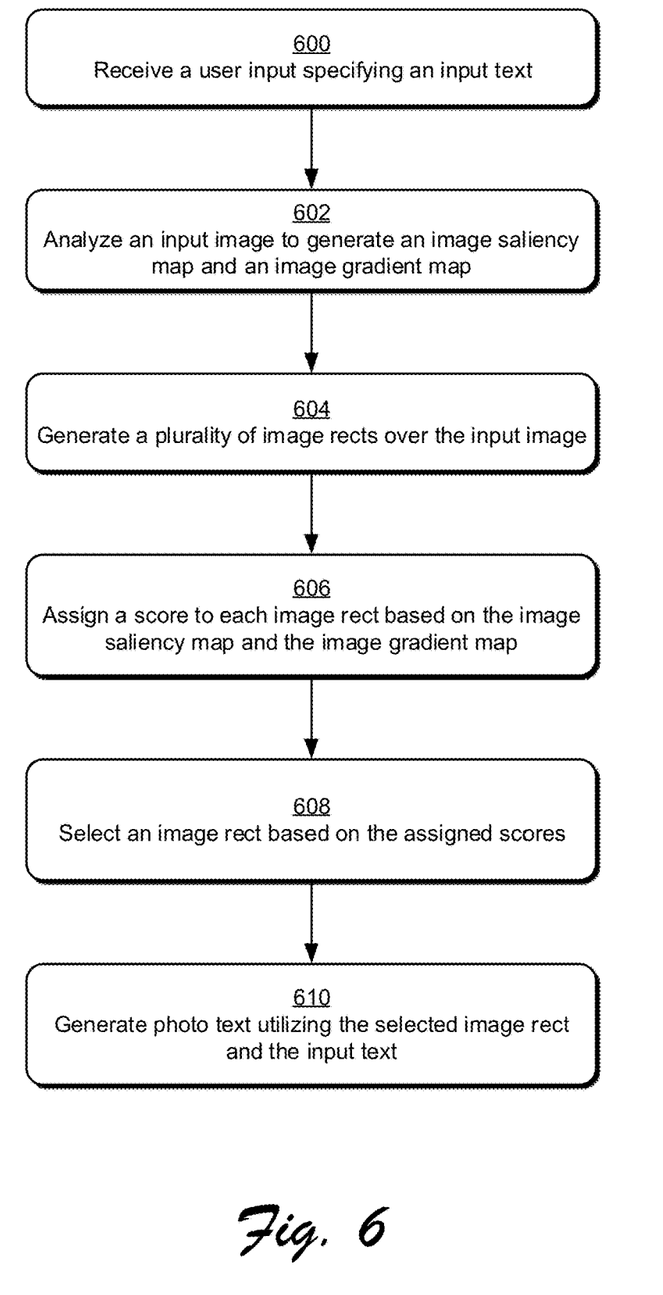
FIG. 6 is a flow diagram depicting a procedure in accordance with one or more embodiments.

FIG. 6 is a flow diagram depicting a procedure in an example embodiment in which a photo text is generated by analyzing an input image and assigning scores to image rects over the input image.

Step 600 receives a user input specifying an input text. For example, a user of the computing device 102 enters an input text into a user interface of the computing device 102. The input text may originate in a variety of ways, such as detected using touchscreen functionality of a display device, use of a cursor control device or stylus, detected using a camera and without using touch as part of a natural user interface, use of a keyboard, and so forth.

Step 602 analyzes an input image to generate an image saliency map and an image gradient map. For example, the image saliency module 204 of the image analysis system 104 generates an image saliency map, and the image gradient module 206 of the image analysis system 104 generates an image gradient map. The image saliency map is generated by analyzing the input image for pattern distinctness and color distinctness, and applying known priors on human preferences and image organization. The image gradient map is generated by analyzing the input image for directional change in the intensity or color.

Step 604 generates a plurality of image rects over the input image. For example, the rect generation system 106 receives the input image and densely sample a grid over the input image. At each location on the grid, a plurality of rects of different sizes and different aspect ratios are created.

Step 606 assigns a score to each image rect based on the image saliency map and the image gradient map. For example, the rect scoring system 108 receives the image saliency map and the image gradient map from the image analysis system 104, receives the generated rects from the rect generation system 106, and utilizes the image saliency map and the image gradient map to assign a score to each of the generated rects.

Step 608 selects an image rect from the plurality of rects based on the assigned scores. The selected rect is, for example, a rect with a highest assigned score from the plurality of rects. Additional criteria may be utilized in the selection process. For example, the selection may be incorporate a known aspect ratio of the input text and select a rect with a highest score among only those rects with the particular aspect ratio.

Step 610 generates photo text by utilizing the selected image rect and the input text. For example, the photo text generation system 110 creates a clipping mask incorporating the shape of the input text. The location of the selected image rect is utilized as a location to place the clipping mask within a clipping set. The clipping mask is configured as a layer of a clipping set such that the content of all other layers are obscured except for portions specifically allowed by the clipping mask. This may involve utilizing the input image as a top layer of the clipping set and the clipping mask as the bottom layer of the clipping set. Upon combining the layered clipping mask and input image, only the portions of the input allowed by the clipping mask in the shape of the input text remain. The generated photo text is configured in a format that may be output or displayed, such as via a user interface of an end-user computing device. In some embodiments, the generated photo text is output as a candidate for placement in a document. The generated photo text is capable of being manipulated by a user, such as to be copied, moved, resized, and so forth.

Figure 7:
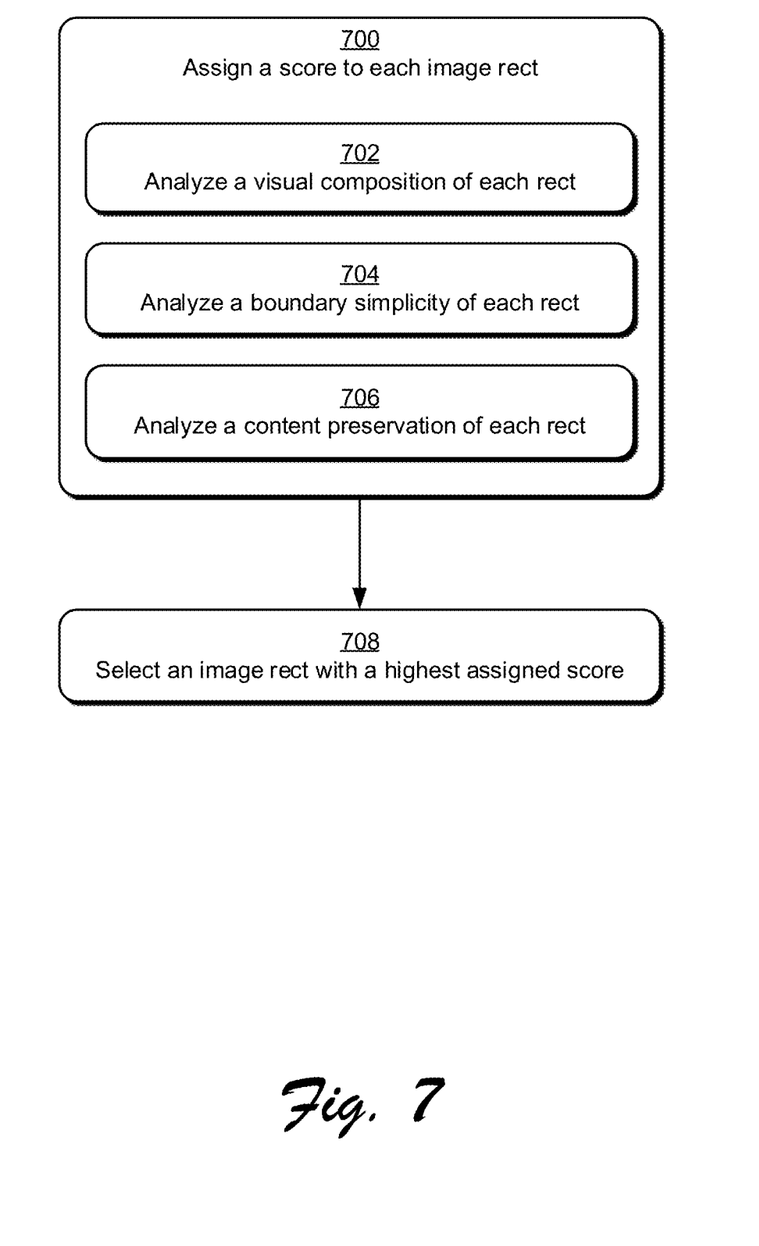
FIG. 7 is a flow diagram depicting a procedure in accordance with one or more embodiments.

FIG. 7 is a flow diagram depicting a procedure in an example embodiment in which scores are assigned to image rects. The procedure, for instance, describes an example variation and/or extension of the procedure described above with reference to FIG. 6.

Step 700 assigns a score to each image rect. To assign scores to rects, a visual composition is analyzed in step 702, a boundary simplicity is analyzed in step 704, and a content preservation is analyzed in step 706.

Step 702 analyzes a visual composition of each rect of a plurality of rects. This may be performed, for example, by the visual composition module 208 of the rect scoring system 108. The visual composition of each rect is determined through use of a machine learning system tuned to recognize portions of an image that users would choose as being the most desirable portions of the image. The portions of the image corresponding to each image rect are passed to the machine learning system as an input, and the machine learning system outputs information pertaining to the visual composition of each image rect based on a learned relationship. This information may be a likelihood of importance of content to human users. Based on this information, a score for visual composition is assigned to each rect such that rects with more desirable portions of the image are assigned a higher score.

Step 704 analyzes a boundary simplicity of each rect. This may be performed, for example, by the boundary simplicity module 210 of the rect scoring system 108. The boundary simplicity of each rect is determined by comparing edge information for the image with the boundaries of each image rect. The edge information for the image is determined by utilizing an image gradient map for the image. Rects with few intersections of edges in the image and the rect boundaries are assigned a higher score than rects with many intersections of edges in the image and the rect boundaries.

Step 706 analyzes a content preservation of each rect. This may be performed, for example, by the content preservation module 212 of the rect scoring system 108. The content preservation of each rect is determined by utilizing an image saliency map for the image. Rects corresponding to a larger number of salient pixels are assigned a score higher than rects with fewer salient pixels.

Step 708 selects an image rect with a highest assigned score. The visual composition score, boundary simplicity score, and content preservation score of each respective rect are combined into an overall score. Rects with a single value below a threshold minimum score may be excluded from consideration and not assigned an overall score. The combination may be a simple addition of the scores, or may incorporate weighting a particular score higher or lower than another score. In some embodiments, weights for the scores are set by a user. For example, a user might have a preference for photo texts with high visual composition and content preservation and consider boundary simplicity to be less important. In such an example, the user assigns a lower weight to the boundary simplicity score than to the visual composition or content preservation scores. The image rect with a highest overall score is selected from the plurality of rects.

Having discussed some example procedures, consider now a discussion of an example system and device in accordance with one or more embodiments.

Example System and Device

Figure 8:
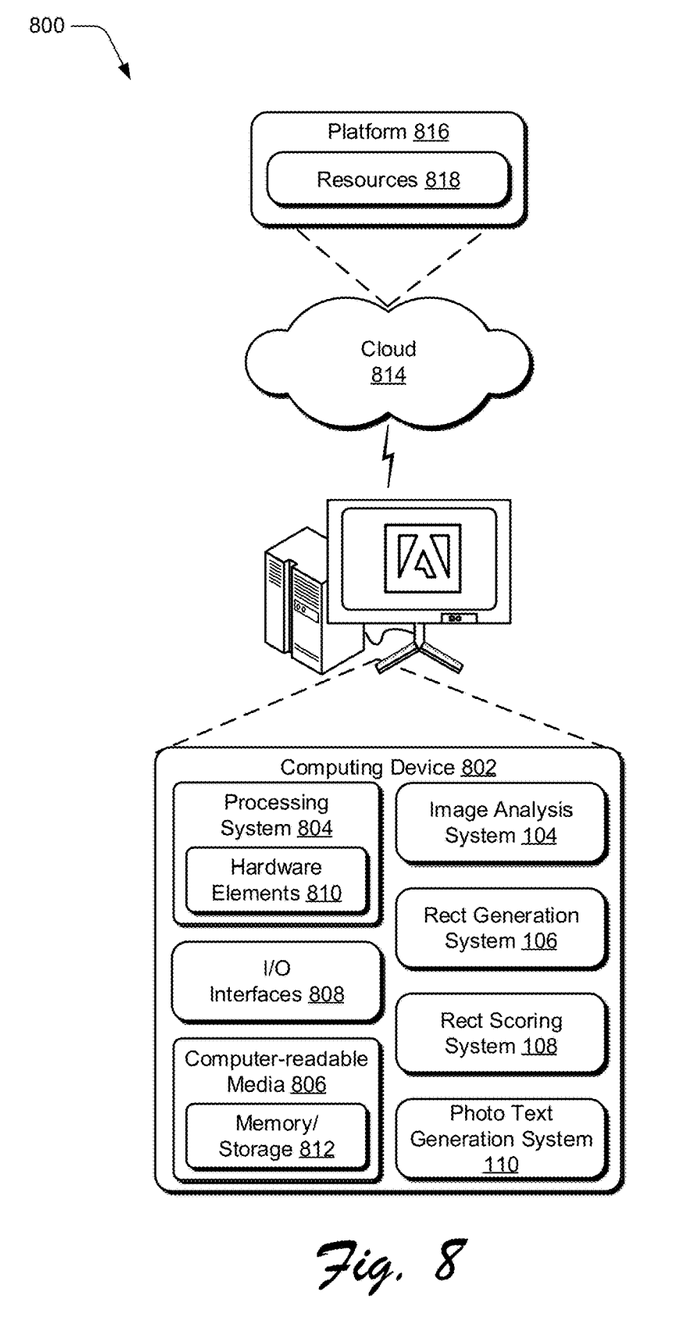
FIG. 8 illustrates an example system including various components of an example device that can be implemented as any type of computing device as described and/or utilized with reference to FIGS. 1-7 to implement embodiments of the techniques described herein.

FIG. 8 illustrates an example system generally at 800 that includes an example computing device 802 that is representative of one or more computing systems and/or devices that may implement the various techniques described herein. This is illustrated through inclusion of the image analysis system 104, the rect generation system 106, the rect scoring system 108, and the photo text generation system 110. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include embodiment in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An embodiment of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other embodiments in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, embodiment of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 616 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, embodiment of functionality described herein may be distributed throughout the system 800. For example, the functionality may be implemented in part on the computing device 802 as well as via the platform 816 that abstracts the functionality of the cloud 814.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method for photo text creation, comprising:
   generating, by at least one computing device, an image saliency map by analyzing an input image, the image saliency map representing a prominence of objects within the input image;
   generating, by the at least one computing device, an image gradient map by analyzing the input image, the image gradient map representing a directional change of intensity or color within the input image;
   assigning, by the at least one computing device, a score to each of a plurality of portions of the input image by, for each respective portion:
      determining a content preservation score based on the image saliency map;
      determining a boundary simplicity score based on the image gradient map; and
      determining the score based on the content preservation score and the boundary simplicity score;
   selecting, by the at least one computing device, a portion from the plurality of portions of the input image based on the assigned scores;
   generating, by the at least one computing device, the photo text by utilizing an input text and the selected portion of the input image; and
   outputting, by the at least one computing device, the photo text for display on a display device.

2. The method of claim 1, wherein the plurality of portions of the input image include portions of different sizes.

3. The method of claim 1, wherein the plurality of portions of the input image include portions of different aspect ratios.

4. The method of claim 1, wherein the assigning a score to each of the plurality of portions comprises analyzing a boundary simplicity of each of the plurality of portions of the input image by comparing edges in the image gradient map to edges of the plurality of portions.

5. The method of claim 1, wherein the assigning a score to each of the plurality of portions of the input image further comprises:
   analyzing a visual composition of each of the plurality of portions of the input image by utilizing a machine learning system; and wherein the determining the score is further based on the visual composition.

6. The method of claim 1, wherein generating the photo text further comprises utilizing the input image as a top layer of a clipping set and utilizing the input text as a bottom layer of the clipping set, the input text located in a location corresponding to the selected portion.

7. The method of claim 1, wherein generating the photo text further comprises utilizing the input image as a top layer of a clipping set and utilizing the input text as a bottom layer of the clipping set, the input text located in a location corresponding to the selected portion, and including at least one of a bevel, a drop shadow, or a stroke along edges of the photo text.

8. The method of claim 1, wherein the generating the image saliency map is based on a pattern distinctness detection, a color distinctness detection, and priors on human preferences and image organization.

9. The method of claim 8, wherein the pattern distinctness detection includes determining a pattern distinctness at each of multiple image resolutions of the input image and the color distinctness detection includes determining a color distinctness at each of the multiple image resolutions.

10. A system for photo text creation, comprising:
an image analysis system implemented by a computing device to generate:
an image saliency map representing a prominence of objects within the input image by analyzing an input image; and
an image gradient map by analyzing the input image, the image gradient map representing a directional change of intensity or color within the input image;
a rect scoring system implemented by the computing device to:
assign a score to each of a plurality of image rects of the input image by, for each respective image rect:
determining a content preservation score based on the image saliency map;
determining a boundary simplicity score based on the image gradient map; and
determining the score based on the content preservation score and the boundary simplicity score; and
select an image rect from the plurality of image rects of the input image based on the assigned scores; and
a photo text generation system implemented by the computing device to generate the photo text by utilizing an input text and the selected image rect of the input image.

11. The system of claim 10, wherein the plurality of image rects include image rects of different sizes.

12. The system of claim 10, wherein the plurality of image rects include image rects of different aspect ratios.

13. The system of claim 10, wherein the rect scoring system is further configured to determine the score based on an analysis of a visual composition of each of the plurality of image rects by a machine learning system.

14. The system of claim 10, wherein the photo text generation system is further configured to receive a user input indicating that the photo text is to be placed in a document and place the photo text in the document.

15. The system of claim 10, wherein the assigning a score to each image rect by the rect scoring system is further based on analyzing a visual composition of each image rect by utilizing a machine learning system, and wherein generating the photo text further comprises utilizing the input image as a top layer of a clipping set and utilizing the input text as a bottom layer of the clipping set, the input text located in a location corresponding to a location of the selected image rect.

16. A system for photo text creation, comprising:
means for assigning a score to each of a plurality of portions of an input image including, for each respective portion, means for determining a content preservation score based on image saliency, means for determining a boundary simplicity score based on image gradients, and means for determining the score based on the content preservation score and the boundary simplicity score;
means for creating a clipping mask with features at a location corresponding to a portion of the input image that has a highest assigned score;
means for generating the photo text by utilizing an input text, the input image, and the clipping mask; and
means for displaying the photo text on a display device.

17. The system as described in claim 16, wherein the assigning means is further configured to analyze a visual composition of each portion of the input image by utilizing a machine learning system.

18. The system as described in claim 16, further comprising means for generating an image gradient map for the input image, and further comprising means for generating an image saliency map for the input image, wherein the assigning means is configured to analyze a visual composition of each portion of the input image by utilizing a machine learning system, analyze a boundary simplicity of each portion of the input image based on the image gradient map, and analyze a content preservation of each portion of the input image based on the image saliency map.

19. The system as described in claim 16, wherein the creating means is configured to create the clipping mask such that the clipping mask incorporates the shape of the input text at the location corresponding to a portion of the input image that has a highest assigned score.

20. The system as described in claim 16, wherein the generating means is configured to utilize the input image as a top layer of a clipping set and utilize the clipping mask as a bottom layer of the clipping set.

\* \* \* \* \*